United States Patent
Krishnan et al.

(10) Patent No.: US 11,343,673 B2
(45) Date of Patent: May 24, 2022

(54) ENHANCED AGGREGATED RE-AUTHENTICATION FOR WIRELESS DEVICES

(71) Applicant: Telefonaktiebolaget LM Ericsson (publ), Stockholm (SE)

(72) Inventors: Suresh Krishnan, Suwanee, GA (US); Catherine Truchan, Lorraine (CA); Peyman Talebi Fard, Vancouver (CA); Stere Preda, Longueuil (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 362 days.

(21) Appl. No.: 16/317,420

(22) PCT Filed: Jul. 14, 2016

(86) PCT No.: PCT/IB2016/054190
§ 371 (c)(1),
(2) Date: Jan. 11, 2019

(87) PCT Pub. No.: WO2018/011619
PCT Pub. Date: Jan. 18, 2018

(65) Prior Publication Data
US 2019/0239071 A1    Aug. 1, 2019

(51) Int. Cl.
*H04L 29/06* (2006.01)
*H04W 12/06* (2021.01)
(Continued)

(52) U.S. Cl.
CPC ........... *H04W 12/06* (2013.01); *H04W 12/61* (2021.01); *H04W 12/76* (2021.01); *H04L 9/3252* (2013.01)

(58) Field of Classification Search
CPC ..... H04W 12/06; H04W 12/61; H04W 12/76; H04W 12/00502; H04W 12/0052; H04W 12/005; H04L 9/3252
See application file for complete search history.

(56) References Cited

U.S. PATENT DOCUMENTS 7,627,122 B1 * 12/2009 Horn ................. H04W 12/06
370/331
8,712,459 B2  4/2014 Lim et al.
(Continued)

FOREIGN PATENT DOCUMENTS

CN  102088668 A  6/2011
CN  102316450 A  1/2012
(Continued)

OTHER PUBLICATIONS

Author Unknown, "Technical Specification Group Core Network and Terminals; Non-Access-Stratum (NAS) protocol for Evolved Packet System (EPS); Stage 3 (Release 14)," Technical Specification 24.301, Version 14.0.1, 3GPP Organizational Partners, Jun. 2016, 452 pages.
(Continued)

*Primary Examiner* — Jeremy S Duffield
*Assistant Examiner* — Hassan A Hussein
(74) *Attorney, Agent, or Firm* — Withrow & Terranova, PLLC

(57) ABSTRACT

Methods and systems for group re-authentication of devices in a wireless telecommunication network are provided. According to one aspect, a method of operation of a base station in a wireless telecommunication network comprises receiving a group authentication request message from a mobility management entity, the group authentication request message comprising a group identifier; identifying at least one user equipment as belonging to a group identified by the group identifier; sending an individual authentication
(Continued)

request message to each identified UE; receiving an authentication response from at least one of the identified UE; aggregating the received at least one authentication response to create a group authentication response message; and sending the group authentication response message to the mobility management entity.

14 Claims, 7 Drawing Sheets

(51) Int. Cl.
*H04W 12/61* (2021.01)
*H04W 12/76* (2021.01)
*H04L 9/32* (2006.01)

(56) References Cited

U.S. PATENT DOCUMENTS

| | | | |
|---|---|---|---|
| 8,769,283 | B2 | 7/2014 | Liu et al. |
| 9,253,178 | B2 | 2/2016 | Blom et al. |
| 9,450,928 | B2 * | 9/2016 | Broustis .............. H04L 63/0884 |
| 10,897,777 | B2 * | 1/2021 | Liu .................... H04W 72/1268 |
| 2010/0056175 | A1 * | 3/2010 | Bachmann .............. H04W 8/08 455/456.1 |
| 2010/0169653 | A1 * | 7/2010 | Takenaka .............. H04L 9/3236 713/176 |
| 2011/0307694 | A1 * | 12/2011 | Broustis ................ H04L 63/065 713/163 |
| 2013/0080782 | A1 | 3/2013 | Rajadurai et al. |
| 2013/0263211 | A1 * | 10/2013 | Neuman ............... H04L 9/3247 726/1 |
| 2013/0291071 | A1 * | 10/2013 | Blom .................... H04L 9/3271 726/4 |
| 2014/0237559 | A1 * | 8/2014 | Zhang .................. H04L 63/062 726/4 |
| 2015/0007280 | A1 * | 1/2015 | Carlson ............... H04L 63/0853 726/5 |
| 2015/0149767 | A1 * | 5/2015 | Oualha ............... H04L 63/0884 713/155 |
| 2015/0319172 | A1 * | 11/2015 | Zhang .................. H04W 12/06 713/169 |
| 2016/0242084 | A1 * | 8/2016 | Campbell ............. H04W 24/04 |
| 2016/0302063 | A1 * | 10/2016 | Ahmed ................. H04W 12/06 |
| 2016/0337850 | A1 * | 11/2016 | Suh ..................... H04L 63/0869 |
| 2017/0201871 | A1 * | 7/2017 | Ryu ........................ H04W 4/70 |
| 2018/0013568 | A1 * | 1/2018 | Muhanna .............. H04L 63/045 |
| 2018/0014337 | A1 * | 1/2018 | Kuge .................... H04W 48/17 |
| 2018/0337782 | A1 * | 11/2018 | Wu ........................ H04L 9/0836 |
| 2020/0344606 | A1 * | 10/2020 | Zaus ..................... H04W 12/06 |
| 2021/0026938 | A1 * | 1/2021 | Embrechts .............. G06F 21/40 |

FOREIGN PATENT DOCUMENTS

| | | | | |
|---|---|---|---|---|
| CN | 103314605 A | 9/2013 | | |
| WO | 2011156259 A1 | 12/2011 | | |
| WO | WO-2011156259 A1 * | 12/2011 | .......... | H04L 9/0844 |
| WO | 2012016593 A1 | 2/2012 | | |
| WO | 2015070032 A1 | 5/2015 | | |

OTHER PUBLICATIONS

Author Unknown, "Technical Specification Group Services and System Aspects; 3G Security; Security architecture (Release 13)," Technical Specification 33.102, Version 13.0.0, 3GPP Organizational Partners, Jan. 2016, 76 pages.
Author Unknown, "Technical Specification Group Services and System Aspects; 3GPP System Architecture Evolution (SAE); Security architecture (Release 13)," Technical Specification 33.401, Version 13.3.0, 3GPP Organizational Partners, Jun. 2016, 148 pages.
Author Unknown, "Technical Specification Group Radio Access Network; Evolved Universal Terrestrial Radio Access Network (E-UTRAN); S1 Application Protocol (S1-AP) (Release 13)," Technical Specification 36.413, Version 13.3.0, 3GPP Organizational Partners, Jun. 2016, 331 pages.
Bersani, Florent, et al., "The EAP-PSK Protocol: A Pre-Shared Key Extensible Authentication Protocol (EAP) Method," Network Working Group, Request for Comments: 4764, The IETF Trust, Jan. 2007, 64 pages.
Boneh, D., et al., "Aggregate and Verifiably Encrypted Signatures from Bilinear Maps," Advances in Cryptology—Eurocrypt 2003, Lecture Notes in Computer Science, vol. 2656, Springer, Berlin, 2003, pp. 416-432.
Katz, Jonathan, et al., "Aggregate Message Authentication Codes," Topics in Cryptology—CT-RSA 2008, Lecture Notes in Computer Science, vol. 4964, Springer, Berlin, 2008, 11 pages.
Taleb, Tarik, et al., "On alleviating MTC overload in EPS," Ad Hoc Networks, vol. 18, Elsevier B.V., Mar. 2013, pp. 24-39.
International Search Report and Written Opinion for International Patent Application No. PCT/IB2016/054190, dated Mar. 16, 2017, 13 pages.
Written Opinion for International Patent Application No. PCT/IB2016/054190, dated Jun. 5, 2018, 7 pages.
International Preliminary Report on Patentability for International Patent Application No. PCT/IB2016/054190, dated Oct. 2, 2018, 29 pages.
First Office Action for Chinese Patent Application No. 201680089287.7, dated Jul. 5, 2021, 23 pages.
Intention to Grant for European Patent Application No. 16745178.0, dated Jul. 21, 2021, 5 pages.

* cited by examiner

ENHANCED AGGREGATED RE-AUTHENTICATION FOR WIRELESS DEVICES

This application is a 35 U.S.C. § 371 national phase filing of International Application No. PCT/IB2016/054190, filed Jul. 14, 2016, the disclosure of which is incorporated herein by reference in its entirety.

TECHNICAL FIELD

The present disclosure relates to mobility management in a cellular communications network and more particularly relates to group authentication of multiple devices in order to reduce network traffic between a base station and a mobility management entity during mass re-authentication events.

BACKGROUND

The rise in number of Massive Machine Type Communication (M-MTC) devices poses new challenges for both Radio Access Network (RAN) and Evolved Packet Core (EPC) components in terms of connecting a large number of devices and handling the heavy signaling load that can be generated in different situations. It is not uncommon to observe situations in which the EPC is literally flooded with the same type of Non-Access Stratum (NAS) signals such as Attach Request, Authentication Requests/Response, Service Request, etc., following M-MTC triggering or paging of many M-MTC devices. The signal storm that the Mobility Management Entity (MME) must sustain is usually coped with by configuring limits on the frequency of events to process. For example, a MME could be configured to reject all events of a given type when the frequency of such events exceeds a pre-configured threshold. For example, if an MME function implementing Attach Request rate throttling is enabled, Attach Request messages may start being rejected if their frequency exceeds a configured threshold. Such particular traffic communication patterns are not the only things that can lead to heavy EPC control plane traffic: environmental conditions and different operator configurations could also cause signal peaks.

For the particular case of M-MTC re-authentication, the Third Generation Partnership Project (3GPP) Technical Specifications (TSes) define obvious cases where re-authentication is mandatory, such as: (1) the Universal Subscriber Identity Module (USIM) is changed, or (2) the User Equipment (UE) loses the stored security contexts and indicates invalidity of security keys (as a result of, for instance, power outages). Nonetheless, 3GPP TS 33.401 V13.3.0 specifies that "authentication and key setting may be initiated by the network as often as the network operator wishes"—that is, the specific implementation is left to the discretion of the equipment vendor.

For example, a vendor may define how many events of a certain type (e.g., Service Requests) are performed by the UE without being authenticated by the network (e.g., after 10 Service Request—data transmissions—the UE is required to re-authenticate). In this scenario, a large number of similar devices with the same communication pattern (e.g., periodic Uplink (UL) transmissions) are likely to become subject to re-authentication at the same time.

NAS Authentication Request/Response messages, initiated by the MME with authentication material (authentication vectors) received from the Home Subscriber Server (HSS), individually authenticate one UE at a time. An example of this is shown in FIG. 1.

FIG. 1 illustrates the current UE-MME/HSS re-authentication procedure, which is described in the 3GPP TS 33.401 and 24.301. FIG. 1 illustrates interactions between a Base Station (BS) 10 and a MME/HSS (hereinafter referred to as "MME 12") and between the BS 10 and one or more User Equipment (UE) 14.

In conventional 3GPP telecommunications networks, the MME 12 requests authentication for every UE 14 in the set of N UEs to be re-authenticated by sending to each UE 14 a NAS "Authentication Request" message 100 to the BS 10, which forwards the message 102 to the UE 14. Message 102 includes a UE Authentication ($AUTN_{UE}$) Information Element (IE) that contains authentication material, such as a Message Authentication Code (MAC) IE, which the UE 14 uses to authenticate the network. This is described in more detail below. The message 102 also carries a random value, encoded in the "RAND" IE, to 'challenge' the UE 14.

Table 1, below, shows the Authentication Information Element (AUTN IE) encoding. The AUTN value occupies octets 3 to 18, and consists of:

(SQN xor AK)||AMF||MAC=48+16+64 bits where bit 8 of octet 9 is the "separation bit" of the AMF field.

TABLE 1

| AUTN IE encoding | | | | | | | | |
|---|---|---|---|---|---|---|---|---|
| 8 | 7 | 6 | 5 | 4 | 3 | 2 | 1 | |
| Authentication Parameter AUTN IEI | | | | | | | | octet 1 |
| Length of AUTN contents | | | | | | | | octet 2 |
| AUTN | | | | | | | | octet 3 |
| | | | | | | | | . |
| | | | | | | | | . |
| | | | | | | | | . |
| | | | | | | | | octet 18 |

Table 2, below, shows the RES IE encoding.

TABLE 2

| RES IE encoding | | | | | | | | |
|---|---|---|---|---|---|---|---|---|
| 8 | 7 | 6 | 5 | 4 | 3 | 2 | 1 | |
| Authentication Response Parameter IEI | | | | | | | | octet 1 |
| SRES value (or most significant 4 octets of RES) | | | | | | | | octet 2 |
| | | | | | | | | . |
| | | | | | | | | . |
| | | | | | | | | . |
| | | | | | | | | octet 5 |

In response, the UE 14 will use the RAND IE to compute a response (block 104), which is carried in the Response (RES) IE within a NAS "Authentication Response" message 106, which the UE 14 sends to the BS 10. The BS 10 forwards this to the MME 12 as message 108. The RES IE is also of type MAC, which the network (i.e., the MME 12) uses to authenticate the UE 14 (block 110).

FIG. 2 illustrates some of the functions performed by the UE 14, including authentication of the network and calculation of a UE-specific response. The steps presented in FIG. 2 may be part of the calculation blocks 104 and 104' of FIG. 1. In the embodiment illustrated in FIG. 2, the UE 14 receives an authentication request message (e.g., message 102 in FIG. 1), which contains a random number in the RAND IE and authentication parameters in the AUTH IE. The UE 14 shares a secret key (K) with the Home Subscriber Server (HSS).

The RAND and K values are input into function "f5" to produce an Authentication Key (AK). The AUTN IE contains three components: a value that is produced by performing an exclusive OR (XOR) operation of the Sequence Number (SQN) and the AK; an Authentication and key Management Field (AMF) value; and a value for the MAC. The first of these three values is XORed with the AK produced by function f5 to produce SQN. The UE 14 then verifies that the value of SQN is in the correct range (block 200). The values of K, RAND, SQN, and AMF are input into function "f1" to produce a value, XMAC. The UE 14 then verifies that the value of XMAC so produced matches the value of the MAC contained in the AUTN IE (block 202). If the value of the SQN is in the correct range and if XMAC=MAC then the UE 14 has successfully authenticated the network. The values of K and RAND are input into function "f2" to produce the UE-specific authentication response (RES) (block 204). The value RES is included in the authentication response (message 106) that is sent by the UE 14 to the BS 10.

As can be seen in FIG. 1, conventional 3GPP networks authenticate each UE 14 individually. FIG. 1 shows that the same interaction—namely, message 100', message 102', block 104', message 106', message 108', and authentication step 110', are repeated for every UE 14 authenticated. For N number of UEs 14, there are 2×N messages exchanged between the BS 10 and the MME 12.

This is less of a problem for broadband UEs since there are smaller numbers of broadband UEs attached to a given base station. However, this poses challenges for M-MTC devices which are known to storm the network with a high signaling load under some conditions, for instance, following power outages or frequent paging.

The current 3GPP authentication scheme is neither perfectly adapted nor optimized for the massive M-MTC scenarios, however: the level of authentication traffic between the BS 10 and the MME 12 is burdensome, especially in scenarios where many devices must be re-authenticated at once. With the advent of M-MTC, where large numbers of low-power or low-computational-power devices have cellular capability, a scenario sometimes referred to as the Internet of Things (IoT), the number of devices that may need to be authenticated at the same time can be very large, potentially swamping the BS-MME links with re-authentication signal messages.

Therefore, it is imperative to have solutions that control the EPC signaling load under events like massive device re-authentication.

SUMMARY

Methods and systems for group authentication of devices in a wireless telecommunication network are provided. According to one aspect, a method of operation of a Base Station (BS) in a wireless telecommunication network comprises receiving a group authentication request message, the group authentication request message comprising a group identifier; identifying at least one User Equipment (UE) as belonging to a group identified by the group identifier; sending an individual authentication request message to each identified UE; receiving an authentication response from at least one of the identified UE; aggregating the received at least one authentication response to create a group authentication response message; and sending the group authentication response message.

In one embodiment, the group authentication request message is received from a Mobility Management Entity (MME).

In one embodiment, the group authentication response message is sent to a MME.

In one embodiment, identifying the at least one UE as belonging to the group identified by the group identifier comprises using mapping information that maps the group identifiers to sets of UEs, each set containing at least one UE.

In one embodiment, the mapping information is received from a MME and stored by the BS.

In one embodiment, the mapping information is inferred by the BSfrom messages exchanged between a MME and the at least one UE.

In one embodiment, identifying the at least one UE as belonging to a group comprises identifying the at least one UE by at least one of: an International Mobile Subscriber Identifier (IMSI); an International Mobile Equipment Identifier (IMEI); and a System Architecture Evolution (SAE) Temporary Mobile Subscriber Identity (S-TMSI).

In one embodiment, the aggregating step comprises performing aggregation for a specified duration of time, after which the sending the group authentication response message is performed.

In one embodiment, performing aggregation for the specified duration of time comprises starting a timer prior to the aggregating step and waiting until the timer ends before finishing the aggregation and sending the group authentication response message.

In one embodiment, the aggregating step is performed until a specified number of authentication responses are received, after which the sending step is performed.

In one embodiment, the aggregating step comprises an Elliptic Curve Cryptography (ECC) operation.

According to another aspect, a BS in a wireless telecommunications network comprises: a network interface for communicating with a telecommunications network; one or more processors; and memory storing instructions executable by the one or more processors, whereby the BS is operable to: receive a group authentication request message, the group authentication request message comprising a group identifier; identify at least one UE as belonging to a group identified by the group identifier; send an individual authentication request message to each identified UE; receive an authentication response from at least one of the identified UE; aggregate the received at least one authentication response to create a group authentication response message; and send the group authentication response message.

In one embodiment, the group authentication request message is received from a MME.

In one embodiment, the group authentication response message is sent to a MME.

In one embodiment, identifying the at least one UE as belonging to the group identified by the group identifier comprises using mapping information that maps the group identifiers to sets of UEs, each set containing at least one UE.

In one embodiment, the mapping information is received from a MME and stored by the BS.

In one embodiment, the mapping information is inferred by the BS from messages exchanged between a MME and the at least one UE.

In one embodiment, identifying the at least one UE as belonging to a group comprises identifying the at least one UE by at least one of: an International Mobile Subscriber Identifier (IMSI); an International Mobile Equipment Identifier (IMEI); and a S-TMSI.

In one embodiment, the aggregating step comprises performing aggregation for a specified duration of time, after which the sending the group authentication response message is performed.

In one embodiment, performing aggregation for the specified duration of time comprises starting a timer prior to the aggregating step and waiting until the timer ends before finishing the aggregation and sending the group authentication response message.

In one embodiment, the aggregating step is performed until a specified number of authentication responses are received, after which the sending (334) the authentication response message is performed.

In one embodiment, the aggregating step comprises an ECC operation.

According to yet another aspect, a BS in a wireless telecommunications network, is presented. The BS is adapted to: receive a group authentication request message, the group authentication request message comprising a group identifier; identify at least one User Equipment, UE, as belonging to a group identified by the group identifier; send an individual authentication request message to each identified UE; receive an authentication response from at least one of the identified UE; aggregate the received at least one authentication response to create a group authentication response message; and send the group authentication response message.

According to yet another aspect, a BS in a wireless telecommunications network comprises: a first receiving module operable to receive a group authentication request message, the group authentication request message comprising a group identifier; an identifying module operable to identify at least one UE as belonging to a group identified by the group identifier; a first sending module operable to send an individual authentication request message to each identified UE; a second receiving module operable to receive an authentication response from at least one of the identified UE; an aggregating module operable to aggregate the received authentication response to create a group authentication response message; and a second sending module operable to send the group authentication response message.

According to yet another aspect, a method of operation of a MME in a wireless telecommunications network comprises: sending, to a BS, a group authentication request message, the group authentication request message comprising a group identifier; receiving from the BS a group authentication response message, the group authentication response message identifying a set of UEs and including an aggregated response comprising an aggregate of the responses received from the identified UE; and verifying the aggregated response.

In one embodiment, verifying the aggregated response comprises: determining whether the aggregated response is valid; and, upon the determination that the aggregated response is valid, identifying the identified set of UEs as being authenticated.

In one embodiment, the method includes, upon a determination that the aggregated response is invalid, performing authentication of each UE in the identified set of UEs individually.

In one embodiment, the method includes, prior to sending the group authentication request message: identifying the set of UEs as belonging to a group having the group identifier, the set containing at least one UE; and sending to the BS at least one of: information that maps the group identifier to the set of UEs; or information that is used by the BS to infer mapping from messages exchanged between the MME and the set of UEs.

In one embodiment, each UE in the set of UEs is identified using at least one of: an IMSI; an IMEI; and a S-TMSI.

In one embodiment, the set of UEs is chosen based on at least one of: UE profiles, UE location, UE type, and UE capabilities.

In one embodiment, the verifying step comprises an ECC operation.

According to yet another aspect, a MME in a wireless telecommunications network comprises: a network interface for communicating with a telecommunications network; one or more processors; and memory storing instructions executable by the one or more processors, whereby the MME is operable to: send to a BS a group authentication request message, the group authentication request message comprising a group identifier; receive from the BS a group authentication response message, the group authentication response message identifying a set of UEs, and including an aggregated response comprising an aggregate of the responses received from the identified set of UEs; and verify the aggregated response.

In one embodiment, verifying the aggregated response comprises: determining whether the aggregated response is valid; and upon the determination that the aggregated response is valid, identifying the identified set of UEs as being authenticated.

In one embodiment, the method further comprises, upon a determination that the aggregated response is invalid, performing authentication of each UE in the identified set of UEs individually.

In one embodiment, the method further comprises, prior to sending the group authentication request message: identifying the set of UEs as belonging to a group having the group identifier, the set containing at least one UE; and sending to the BS at least one of: information that maps the group identifier to the set of UEs; or information that is used by the BS to infer mapping from messages exchanged between the MME and the set of UEs.

In one embodiment, each set of UEs in the set is identified using at least one of: an IMSI; an IMEI; and an S-TMSI.

In one embodiment, the set of UEs are chosen based on at least one of: UE profiles, UE location, UE type, and UE capabilities.

In one embodiment, the verifying step comprises an ECC operation.

According to yet another embodiment, a MME in a wireless telecommunications network is provided. The MME is adapted to: send to a BS a group authentication request message, the group authentication request message comprising a group identifier; receive from the BS a group authentication response message, the group authentication response message identifying a set of UEs and including an aggregated response comprising an aggregate of the responses received from the identified set of UEs; and verify the aggregated response.

According to yet another embodiment, aMME in a wireless telecommunications network comprises: a sending module operable to send to a BS a group authentication request message, the group authentication request message comprising a group identifier; a receiving module operable to receive from the BS a group authentication response message, the group authentication response message identifying a set of UEs and including an aggregated response comprising an aggregate of the responses received from the identified set of UEs; and a verifying module operable to verify the aggregated response.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
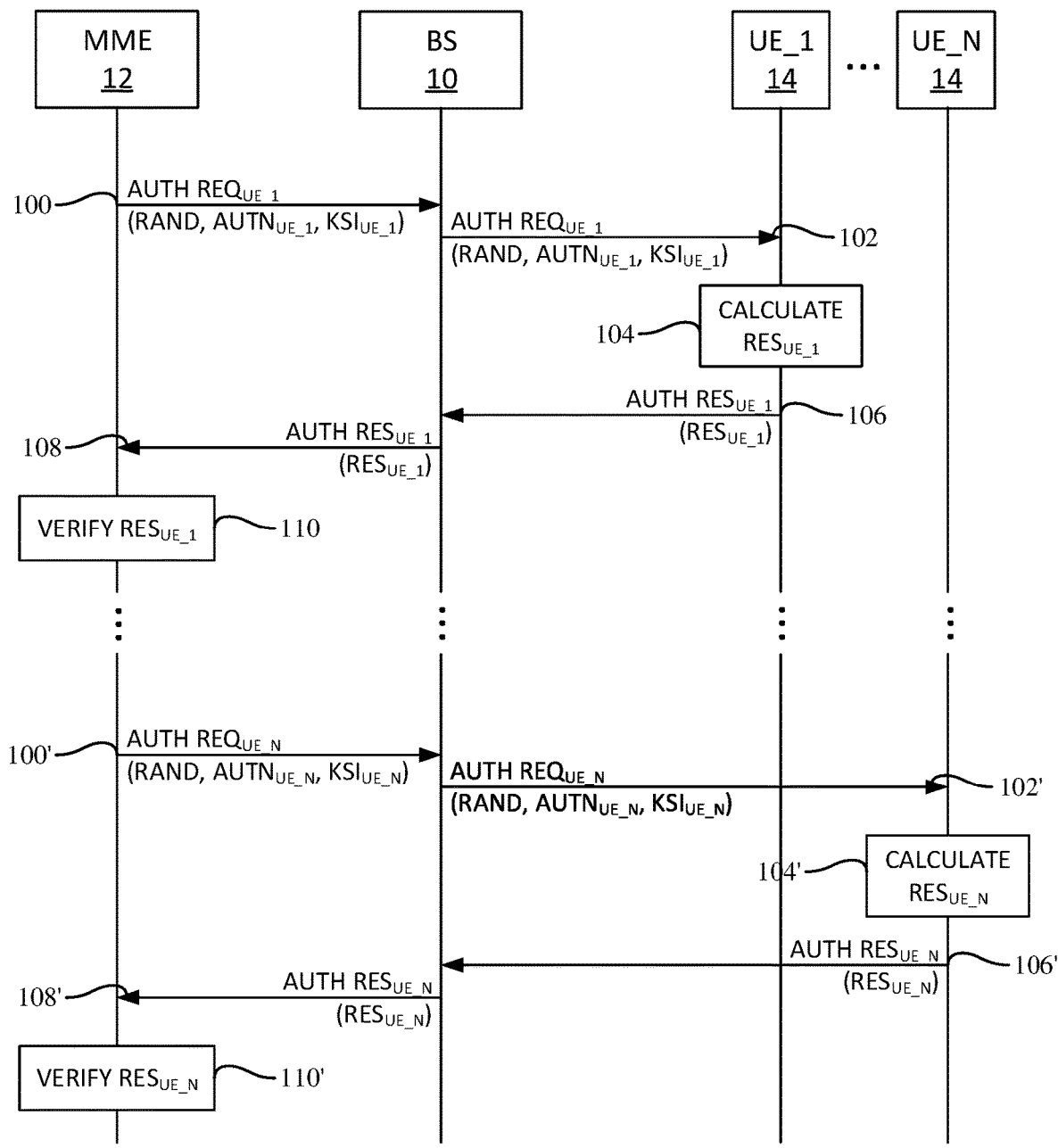
FIG. 1 illustrates the current User Equipment (UE)-Mobility Management Entity (MME)/Home Subscriber Server (HSS) re-authentication procedure, which is described in the Third Generation Partnership Project (3GPP) Technical Specification (TS) 33.401 and 24.301.
Figure 2:
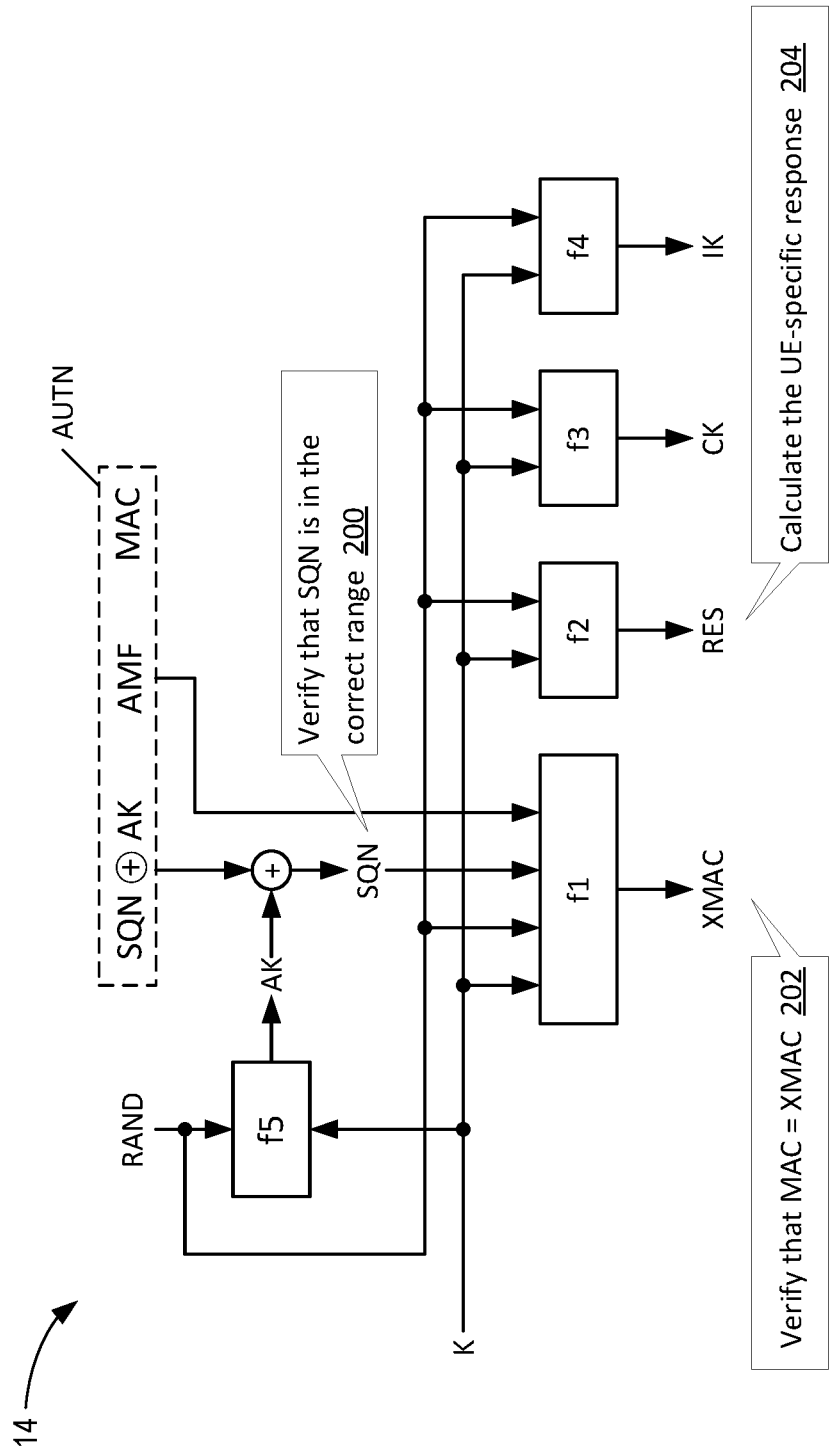
FIG. 2 illustrates some of the functions performed by the UE, including authentication of the network and calculation of a UE-specific response.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

A solution that enables base station aggregation of User Equipment (UE)-Mobility Management Entity (MME)/Home Subscriber Server (HSS) Authentication Request/Authentication Response procedures for groups of Massive Machine Type Communication (M-MTC) devices is provided. The subject matter provided herein is equivalent to optimizing the MME capacity and the S1AP link utilization for M-MTC in the UE-MME/HSS authentication procedure. The subject matter provided herein includes a method and mechanisms to reduce the S1AP signaling load through aggregation for the specific Authentication Request/Authentication Response UE-MME/HSS messages.

Groups of devices are formed on the operator network based on, for instance, location, device traffic pattern communications or profiles stored in the HSS. M-MTC devices in a group are expected to generate similar control plane loads at almost the same time, given they are subject to triggering, attach, authentication, detach, etc., under the same environmental and/or traffic conditions.

The MME is in charge of triggering authentication of (part of) a device group. The MME initiates the authentication by sending an enhanced Authentication Request with a common authentication material for all UEs in a (part of the) group. The enhanced Authentication Request may also be referred to as a "group authentication request." The authentication material, basically containing an MME/HSS signature, different from the legacy authentication material, allows the UEs to authenticate the network.

The UEs reply with enhanced Authentication Response messages that are built so that the base station can aggregate them into a single S1AP message. This S1AP message will contain only one aggregated signature with the same size as the original signatures comprised in the individual Authentication Response messages.

By receiving the S1AP message with one aggregated signature that corresponds to many UEs, the MME/HSS can verify the aggregated signature. Hence the network authenticates the UEs that are subject to signature aggregation.

The UEs with the necessary cryptographic capabilities, e.g., those that support the public-key schemes detailed below, may participate in the methods described herein. Nonetheless, the solution is designed with minimum impact on the current UE. The UE Non-Access Stratum (NAS) Authentication Request/Response message format between the UE and the base station is only slightly changed.

Figure 3:
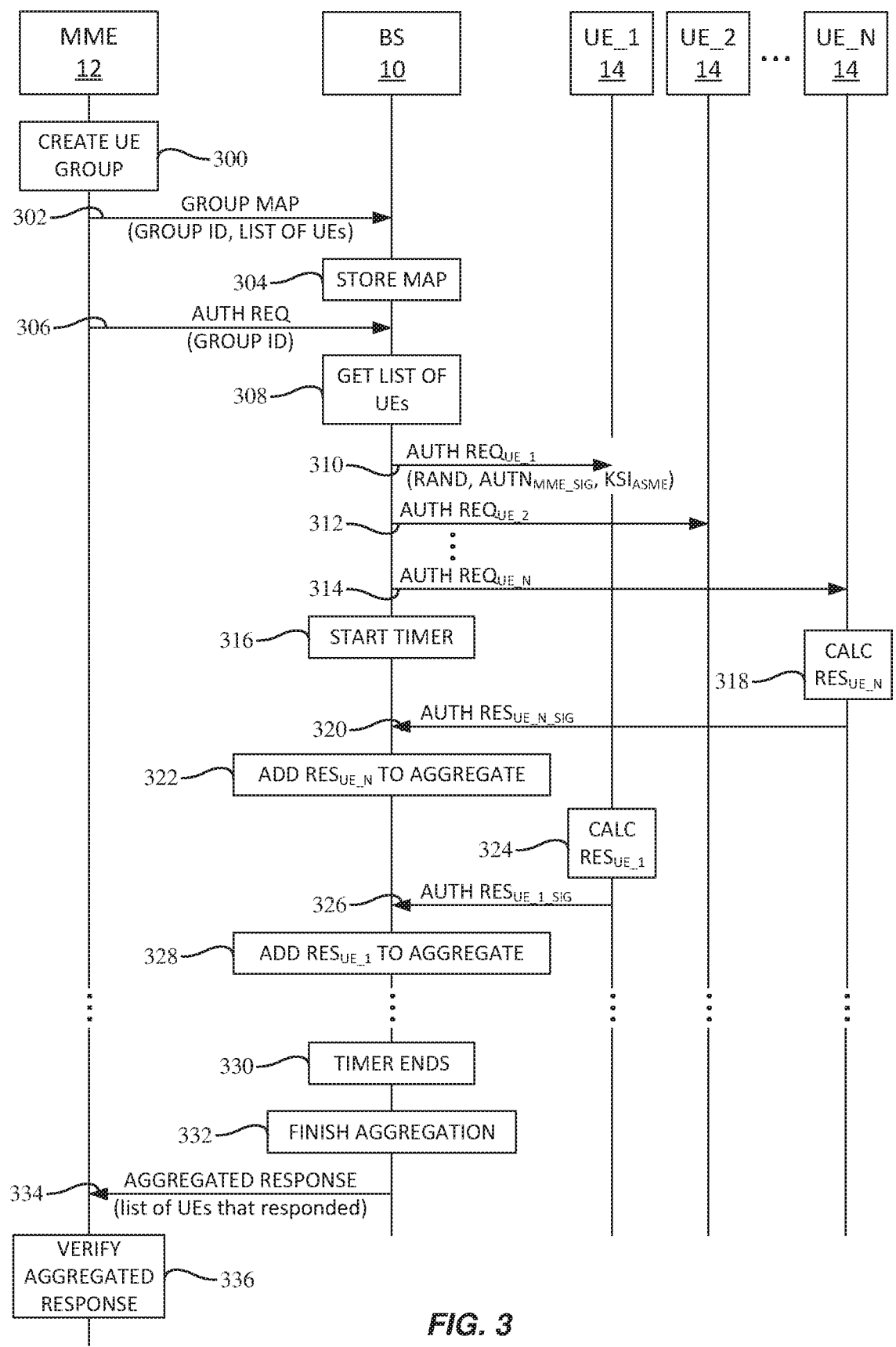
FIG. 3 illustrates an exemplary process for group authentication according to an embodiment of the subject matter described herein.

FIG. 3 illustrates an exemplary process for group authentication according to an embodiment of the subject matter described herein. As a preliminary matter, the same process may be used to authenticate or re-authenticate a group of UEs (but not for authentication at initial attach, which uses the legacy authentication). For the sake of brevity, this process will be referred to as "authentication", but it will be understood that the process may also be used for re-authentication.

In the embodiment illustrated in FIG. 3, in preparation for performing the group authentication methods described herein, the MME 12 defines one or more groups, each group containing the one or more UEs 14 (block 300). The MME 12 then conveys this group information to the BS 10. In the embodiment illustrated in FIG. 3, this information is sent as a group map (message 302) that includes a group identifier (group ID), along with a list of UEs that belong to that identified group. The BS 10 stores that information. In the embodiment illustrated in FIG. 3, the BS 10 stores the group map (block 304). In an alternative embodiment, the MME 12 sends to the BS 10 information that is used by the BS 10 to infer mapping from messages exchanged between the MME 12 and the one or more UEs 14.

When the MME 12 wants to authenticate the group of UEs, it issues a group authentication request (message 306) indicating at least one group to be authenticated. In the embodiment illustrated in FIG. 3, the message 306 includes a group ID. Upon receipt of the group authentication request, the BS 10 will use the group ID(s) to look up or otherwise get the list of UEs to be authenticated (block 308). The BS 10 then issues individual authentication requests to each of the RRC_Connected UEs identified as being in the group or groups. (No requests are sent to idle UEs.) In the embodiment illustrated in FIG. 3, this is shown as authentication request messages 310, 312, and 314. Request message 310 goes to UE_1, request message 312 goes to UE_2, and request message 314 goes to UE_N.

In one embodiment, the BS 10 will listen for responses from the UEs 14 only for a certain amount of time. Thus, in the embodiment illustrated in FIG. 3, the BS 10 starts a timer (block 316). The BS 10 will continue to listen for responses until the timer expires, at which time it will process the received responses and stop listening for additional responses. In alternative embodiments, the BS 10 may listen for responses until a threshold number of responses has been received, in which case the BS 10 may set a counter that is decremented each time a response is received until the counter goes to zero, at which time the BS 10 will process the received responses and stop listening for additional responses. Other approaches are contemplated, including combinations of a timer and a counter as well detection of other trigger conditions that may cause the BS 10 to terminate the listening state and process the responses received, if any.

FIG. 3 illustrates the point that the UEs do not necessarily respond in the same order in which the requests were issued. In the embodiment illustrated in FIG. 3, for example, UE_N receives the authentication request (message 314), calculates the response (block 318), and sends an authentication response (message 320) first, before any of the other UEs 14. The BS 10 receives the authentication response (message 320) from UE_N, and adds the UE_N's response to the aggregate (block 322). As the other UEs 14 respond, their response messages are added to the aggregate in the same manner. In the embodiment illustrated in FIG. 3, UE_1 calculates its response (block 324) and sends the authentication response (message 326) to the BS 10, which the BS 10 adds to the aggregate response (block 328).

This continues until occurrence of the trigger event that causes the BS 10 to exit the listening state and complete the aggregation process. In the embodiment illustrated in FIG. 3, this trigger event is the expiry of the timer (block 330), but as described above, in other embodiments the trigger event might be the receipt of a threshold number of authentication responses, some combination of timer and threshold number, or other trigger condition. Upon termination of the listening state, the BS 10 finishes the aggregation (block 332) and sends the aggregated response to the MME 12 (message 334). In the embodiment illustrated in FIG. 3, the aggregated response (message 334) includes the list of UEs that responded. In alternative embodiments, the list of UEs that responded could be conveyed to the MME 12 in a separate message or messages.

The MME 12 then verifies the aggregated response (block 336). Upon successful verification, the MME 12 then considers as authenticated all of the UEs that were included in the list of UEs. If the verification is unsuccessful, in one embodiment, the MME 12 may then issue individual authentication requests according to conventional methods. Alternatively, the MME 12 may redefine the groups and attempt group authentication again.

In the embodiment illustrated in FIG. 3, the BS 10 aggregates the received responses (e.g., messages 320 and 326) one by one as they are received. In an alternative embodiment, the BS 10 may collect the received responses and store or buffer some or all of the received information until the timer runs out (or other trigger condition is met), at which time all of the received responses are aggregated at the same time.

Figure 4:
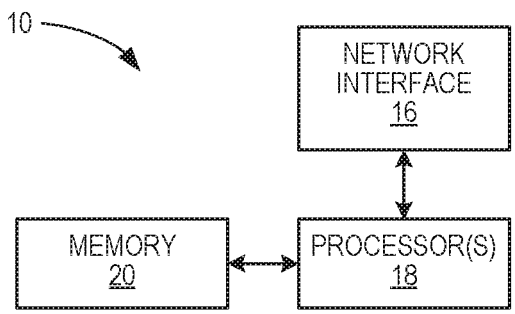
FIG. 4 illustrates a block diagram of an exemplary Base Station (BS) according to an embodiment of the subject matter described herein.

FIG. 4 illustrates a block diagram of an exemplary BS according to an embodiment of the subject matter described herein. In the embodiment illustrated in FIG. 4, the BS 10 includes a network interface 16 for communicating with a telecommunications network, one or more processors 18, and memory 20 storing instructions executable by the one or more processors. The BS 10 is operable to: receive a group authentication request message, which comprises a group identifier; identify at least one UE as belonging to a group identified by the group identifier; send an individual authentication request message to each identified UE; receive an authentication response from at least one of the identified UE; aggregate the received at least one authentication response to create a group authentication response message; and send the group authentication response message.

In one embodiment, the group authentication request message is received from a MME. In one embodiment, the group authentication response message is sent to a MME. In one embodiment, identifying the at least one UE as belonging to the group identified by the group identifier comprises using mapping information that maps the group identifiers to sets of UEs, each set containing at least one UE. In one embodiment, the mapping information is received from a MME and stored by the BS 10. In one embodiment, the mapping information is inferred by the BS 10 from messages exchanged between a MME and the at least one UE. In one embodiment, identifying the at least one UE as belonging to a group comprises identifying the at least one UE by at least one of: an International Mobile Subscriber Identifier (IMSI); an International Mobile Equipment Identifier (IMEI); and a System Architecture Evolution (SAE) Temporary Mobile Subscriber Identity (S-TMSI). In one embodiment, the aggregating step comprises performing aggregation for a specified duration of time, after which the sending the group authentication response message is performed. In one embodiment, performing aggregation for the specified duration of time comprises starting a timer prior to the aggregating step and waiting until the timer ends before finishing the aggregation and sending the group authentication response message. In one embodiment, the aggregating step is performed until a specified number of authentication responses are received, after which the sending the authentication response message is performed. In one embodiment, the aggregating step comprises an Elliptic Curve Cryptography (ECC) operation.

Figure 5:
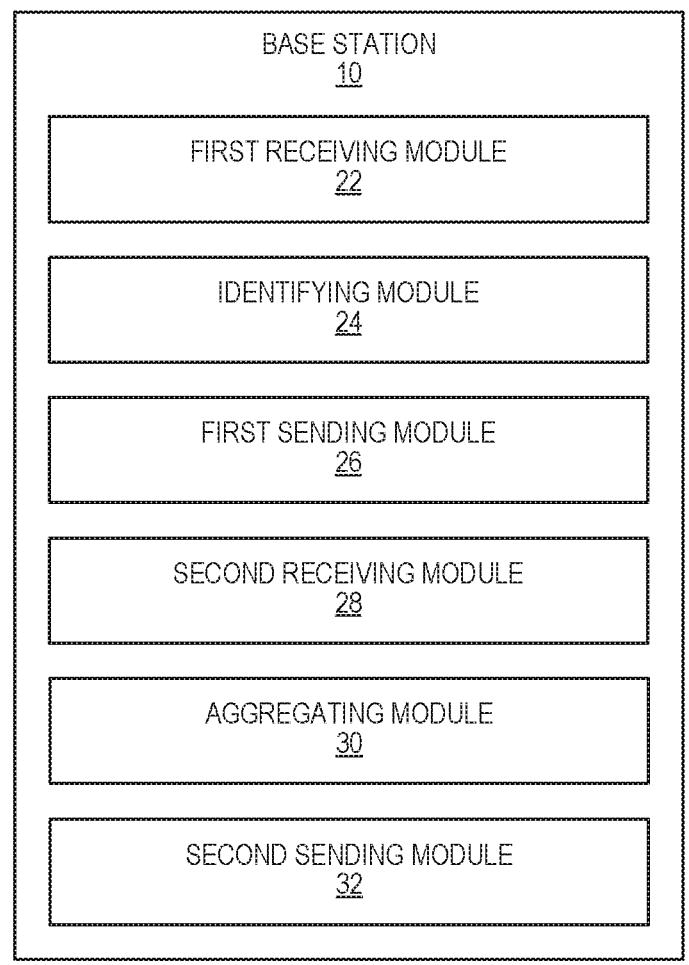
FIG. 5 illustrates a block diagram of an exemplary BS according to another embodiment of the subject matter described herein.

FIG. 5 illustrates a block diagram of an exemplary BS according to another embodiment of the subject matter described herein. In the embodiment illustrated in FIG. 5, the BS 10 includes a first receiving module 22 operable to receive a group authentication request message, the group authentication request message comprising a group identifier; an identifying module 24 operable to identify at least one UE as belonging to a group identified by the group identifier; a first sending module 26 operable to send an individual authentication request message to each identified UE; a second receiving module 28 operable to receive an authentication response from at least one of the identified UE; an aggregating module 30 operable to aggregate the received authentication response to create a group authentication response message; and a second sending module 32 operable to send the group authentication response message.

Figure 6:
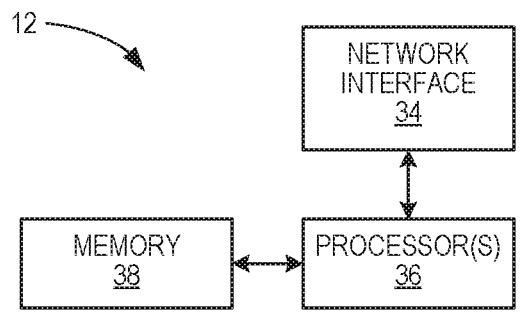
FIG. 6 illustrates a block diagram of an exemplary MME according to an embodiment of the subject matter described herein.

FIG. 6 illustrates a block diagram of an exemplary MME according to an embodiment of the subject matter described herein. In the embodiment illustrated in FIG. 6, the MME 12 includes a network interface 34 for communicating with a telecommunications network, one or more processors 36, and memory 38 storing instructions executable by the one or more processors 36. The MME 12 is operable to: send to a BS a group authentication request message, the group authentication request message comprising a group identifier; receive from the BS a group authentication response message, the group authentication response message identifying a set of UEs and including an aggregated response comprising an aggregate of the responses received from the identified set of UEs; and verify the aggregated response.

In one embodiment, verifying the aggregated response comprises: determining whether the aggregated response is valid; and upon the determination that the aggregated response is valid, identifying the identified set of UEs as being authenticated. In one embodiment, the method further comprises, upon a determination that the aggregated response is invalid, performing authentication of each UE in the identified set of UEs individually. In one embodiment, the method further comprises, prior to sending the group authentication request message: identifying the set of UEs as belonging to a group having the group identifier, the set containing at least one UE; and sending to the BS at least one of: information that maps the group identifier to the set of UEs; or information that is used by the BS to infer mapping from messages exchanged between the MME and the set of UEs. In one embodiment, each set of UEs in the set is identified using at least one of: an IMSI; an IMEI; and an S-TMSI. In one embodiment, the set of UEs are chosen based on at least one of: UE profiles, UE location, UE type, and UE capabilities. In one embodiment, the verifying step comprises an ECC operation.

Figure 7:
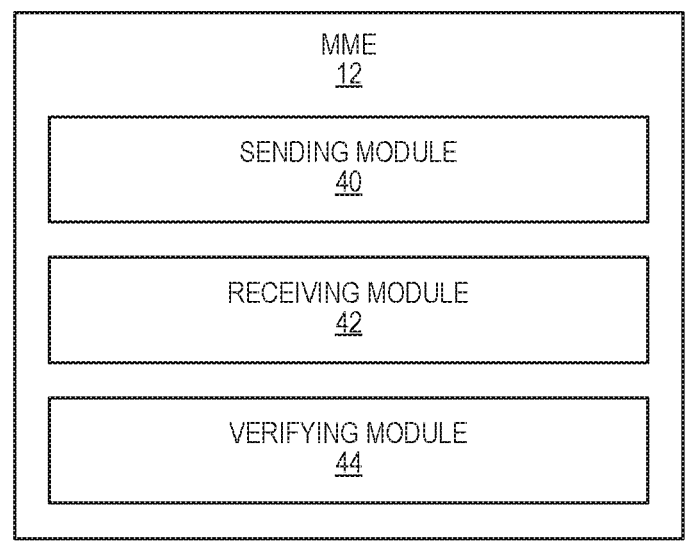
FIG. 7 illustrates a block diagram of an exemplary MME according to another embodiment of the subject matter described herein.

FIG. 7 illustrates a block diagram of an exemplary MME according to another embodiment of the subject matter described herein. In the embodiment illustrated in FIG. 7, the MME 12 comprises: a sending module 40 operable to send to a BS a group authentication request message, the group authentication request message comprising a group identifier; a receiving module 42 operable to receive from the BS a group authentication response message, the group authentication response message identifying a set of UEs and including an aggregated response comprising an aggregate of the responses received from the identified set of UEs; and a verifying module 44 operable to verify the aggregated response.

Figure 8:
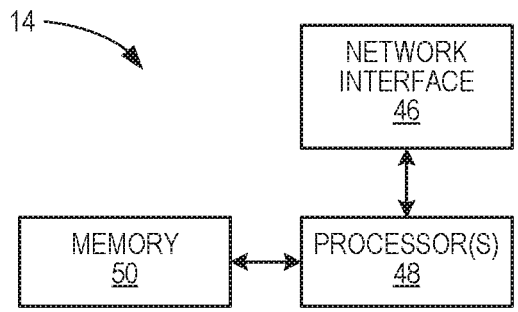
FIG. 8 illustrates a block diagram of an exemplary UE according to an embodiment of the subject matter described herein.

FIG. 8 illustrates a block diagram of an exemplary UE 14 according to an embodiment of the subject matter described herein. In the embodiment illustrated in FIG. 8, the UE 14 comprises a network interface 46 for communicating with a telecommunications network; one or more processors 48; and memory 50 storing instructions executable by the one or more processors. The UE 14 is operable to: receive from a BS an authentication request message, the authentication request message comprising authentication information; authenticate the network using the authentication information; calculate a UE-specific response using the authentication information; and send the calculated UE-specific response to the BS. In one embodiment, the authentication information comprises at least one of: a random number (RAND); a Sequence Number (SQN); a Message Authentication Code (MAC); an Authentication and Key Management Field (AMF); and a Key Set Identifier (KSI). In one embodiment, the authentication information received from the BS includes a MME-specific signature (MME_SIG), which the UE 14 uses to authenticate the network, BS, and/or the MME. In one embodiment, calculating the UE-specific response comprises performing an ECC operation. In one embodiment, during an initial attach operation to the network, the UE signals a capability to participate in a group authentication operation. In one embodiment, signaling a capability to participate in a group authentication operation comprises signaling a capability to perform an ECC operation.

Figure 9:
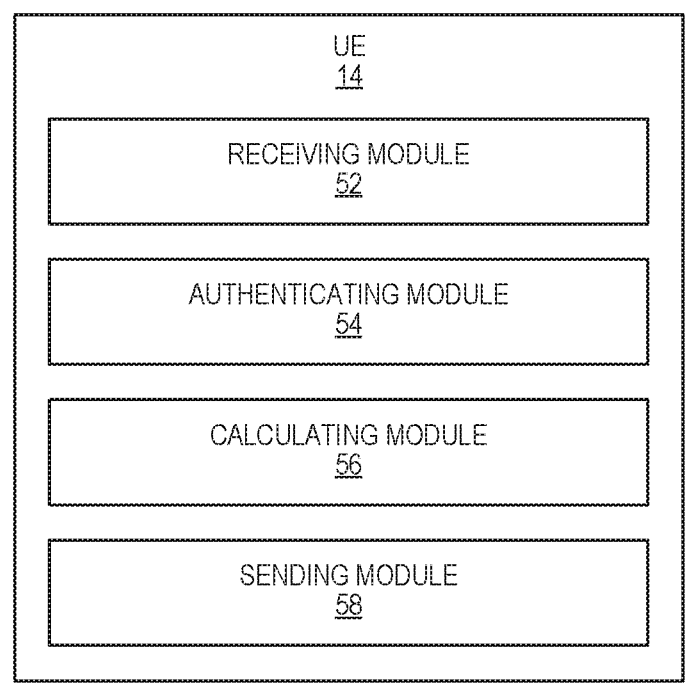
FIG. 9 illustrates a block diagram of an exemplary UE according to another embodiment of the subject matter described herein.

FIG. 9 illustrates a block diagram of an exemplary UE 14 according to another embodiment of the subject matter described herein. In the embodiment illustrated in FIG. 9, the UE 14 comprises: a receiving module 52 operable to receive from a BS an authentication request message, the authentication request message comprising authentication information; an authenticating module 54 operable to authenticate the network using the authentication information; a calculating module 56 operable to calculate a UE-specific response using the authentication information; and a sending module 58 operable to send the calculated UE-specific response to the BS.

Implementation Details

The methods and systems described herein preserve the same authentication model defined in Third Generation Partnership Project (3GPP), i.e., mutual authentication in two steps (Authentication Request/Authentication Response) by leveraging the secrets that reside in the Universal Subscriber Identity Module (USIM) (the pre-shared secret key K) and enables aggregation of signaling messages, which is thus equivalent to optimizing the MME/HSS capacity. These concepts can be extended to other procedures involving authenticated procedures. Potential future procedures requiring authentication designed to enforce security and/or to counterattack denial-of-service attacks could benefit from the concepts described herein. In what follows, the terms "M-MTC device" and "UE" are interchangeable.

There are a number of ways that messages could be aggregated. For example, messages could be aggregated using different algebraic constructs, such as XORing different messages together to create an aggregated message. One such approach is referred to as Aggregated Message Authentication Codes, or AMAC, which performs an XOR on MAC messages. This approach has the advantage that it can leverage the 3GPP legacy UE-network authentication scheme, which is based on MAC functions. However, given that MAC is based on pre-shared secret keys (as for symmetric encryption, every UE shares a different K key with the network), a MAC aggregation scheme reduces only the S1AP Uplink (UL) signaling (Authentication Response) through MAC aggregation and not the S1AP Downlink (DL) signaling (Authentication Requests). Reducing only UL signaling is better than reducing no signaling at all, but it is desirable to reduce both UL signaling and DL signaling if possible. For this reason, AMAC was considered to be only a partial solution. Another weakness of the AMAC approach is that it, like any approach that uses XOR as the primary mathematical function for aggregation, is not very robust, i.e., two bit errors in the same location can cancel each other out to give a false positive authentication result.

Thus, the following principles were used during development of a group authentication algorithm—namely, that any mathematical construct allowing S1AP UL message aggregation should feature several properties:

First, that the mathematical construct be useful to optimize the overall authentication signaling load, i.e., that both UL and DL S1AP signaling is reduced, not just one or the other.

Second, that the mathematical construct be suitable for implementation by devices having hardware constraints, e.g., processor power, memory capacity, and so on.

Third, that the mathematical construct be resistant to "forgery attacks". This is a general goal for any signature scheme, but some signature schemes are more resistant to forgery attacks than others.

In view of the characteristics listed above, an implementation using ECC and bilinear maps was developed. The methods and systems described herein meet the first property because both UL and DL S1AP signaling is reduced, meet the second property because ECC schemes are known to be less computationally expensive with shorter signature lengths than RSA signatures for similar levels of security, and meet the third property because ECC-based signatures are proven to be highly resistant to forgery attacks. The ECC and bilinear map approach described herein employs one Authentication Request message that carries the network signature, which is verifiable by all UEs in the group.

It is noted, however, that the subject matter is not limited to just the particular ECC-based methods disclosed herein, but contemplates other mathematical constructs that satisfy the properties listed above.

The group authentication methods described herein include several mechanisms for reducing the MME signaling load during massive re-authentication. These mechanisms differ from the conventional approach in that the semantics of the Authentication Information Element (AUTN) and RES IEs in the NAS Authentication Request/Response are modified.

First Mechanism:

a mechanism to allow a group of devices to authenticate the network. In one embodiment, the network operator can configure UE group creation based on UE profiles, location, etc. Hence, the MME has the knowledge of groups of UEs in terms of, for instance, associating an IMSI-S-TMSI with a group-ID. Furthermore, without duplicating the "Authentication Request" message for every UE using different UE S1AP associations, the MME can send a single S1AP message of type "Authentication Request" that is flagged for a given group. This "Authentication Request" is then sent by the base station to the active UEs in that group. These UEs have their identities associated with the group-ID.

Second Mechanism:

a mechanism that allows the base station to aggregate many "Authentication Responses" into a single S1AP message. In one embodiment, after sending the NAS Authentication Request message, the base station starts a timer and collects the UE Authentication Responses until the timer expires. It is possible that not all UEs in a group reply with "Authentication Response" within this time period. Also, the base station can be configured to aggregate up to a certain number of UE Authentication Responses in one S1AP message. The maximum number of UE Authentication Responses to aggregate in one S1AP message is configurable, e.g., limited by the MTU on the base station-MME link. This aggregation does not represent a simple bulk concatenation of Authentication Responses into one S1AP message. The methods described herein ensure that all UE authentication material (the RES values) is replaced with one new value that still allows the MME to authenticate all the UEs that are part of the aggregation without any extra-signaling.

Third Mechanism:

a Mechanism that allows the MME to send the mapping of group-IDs to UE identities to the base station and also to trigger the UE so that all subsequent (re)authentication requests use the proposed scheme.

These three mechanisms will now be described in detail:

First Mechanism

In one embodiment, the First Mechanism relies on ECC to implement digital signatures. The MME sends a unique signed Authentication Request message, which can be, for instance: $M_{MME}$=(SQN xor AK)∥RAND∥ KSIasme. Given the sig(message, $priv_k$)—the ECC public-key signature function taking a message to sign and a private $priv_k$ key—the signature MME_SIG=sig($M_{MME}$, $priv_{MME\_k}$), where $priv_{MME\_k}$ is an MME private key, is verifiable by any UE within the group.

Thus, the AUTN IE is modified compared to the conventional AUTN IE in that the signature MME_SIG replaces the MAC IE. The other AUTN parameters remain unchanged and are unique for one group. RAND, too, is the same for all UEs in one group.

The enhanced Authentication Request is not associated to any particular UE (i.e. by S1AP association) in the group. The S1AP message is enhanced to include a group-ID field. The group-ID in message 306 of FIG. 3 initiates/triggers the BS 10 to send Authentication requests for all connected UEs (i.e. RRC_CONNECTED state) in that group. Within the time frame defined by the timer, the BS 10 collects the Authentication Response messages and aggregates them into one S1AP message as described by the Second Mechanism.

Second Mechanism

In one embodiment, the Second Mechanism relies on ECC to implement digital signatures. Every UE signs the Authentication Response and places the UE_SIG signature in the RES IE. A specific public-key scheme is chosen so that the base station is able to perform a signature aggregation: all the RES from the group UEs are replaced with a transformed signature UE_TRANSF_SIG that enables the MME to authenticate the group of UEs. This mechanism sends the UE group-ID to the base station and commands the UE to use the proposed authentication scheme only if the UE supports ECC cryptography.

The signature aggregation scheme requires that the original signatures be performed on distinct messages; otherwise, the aggregated signature verifications will fail. Thus, in one embodiment, the UE generates signatures for messages including unique UE identifiers that are known by the MME, such as S-TMSI. The following message is an example of a distinct UE message that can be signed:

$M_{UE}$=S-TMSI∥RAND (where RAND is in the one received in Authentication Request)

UE_SIG=sig($M_{UE}$, $priv_{UE\_k}$) with sig(message, $priv_k$)—the public-key signature function taking a message to sign and a private $priv_k$ key.

Thus, the RES IE is modified compared to the conventional RES IE in that the signature UE_SIG is included in the response to the BS 10 instead of the conventional RES IE. The UE 14 does not have to embed the $M_{UE}$. The BS 10 can associate an Authentication Response with the corresponding S-TMSI for instance.

At timer expiration or by reaching the maximum message size, the BS 10 aggregates all the UE_SIG into one transformed UE_TRANSF_SIG signature that has the same size as the original UE_SIG. The UE_TRANSF_SIG value may or may not be computed on the fly, depending on implementation. The BS 10 builds the S1AP message by also including identifiers of those UEs that replied to the Authentication Request. In order to reduce the S1AP message size, the BS 10 can use M-TMSI (4 octets). For a given signature of 40 octets (320 bits) and an MTU of 1500 octets, there may be more than 300 Authentication Responses aggregated in one S1AP message. For a 9000 MTU, there may be more than 1800 aggregated UEs with Authentication Responses aggregated in one single S1AP message. Thus, the S1AP Authentication Response will be modified compared to the conventional S1AP Authentication Response in that the group authentication response will include an aggregated authentication response.

Third Mechanism

Conventional 3GPP re-authentication relies on the existence of the K pre-shared key between the USIM/UE and the MME/HSS for both authentication and computation of the Kasme root key [see 3GPP TS 33.401]. In order to reduce MME signaling, the subject matter disclosed herein includes the use of public-key cryptography for the authentication procedure while maintaining the original Kasme key derivation scheme.

In order to participate in the methods and systems disclosed herein, a UE 14 needs to support ECC, which offers the algebraic construction necessary for the implementations described herein. In one embodiment, the BS 10 may command the UE 14 to use the group authentication scheme only if the UE 14 supports ECC.

In one embodiment, for the initial authentication at UE Initial Attach, the UE 14 and the MME 12 may rely on the 3GPP legacy authentication. It is assumed that the UE 14 and the MME 12 do not share any security context before the first initial attach. During the Initial Attach, if the UE 14 supports ECC, the MME 12 may associate this UE 14 to a group-ID, in which case the MME 12 may instruct the UE 14 to switch the authentication scheme from the legacy authentication scheme to the group authentication scheme for all subsequent authentication requests. In one embodiment, the UE also receives the parameters (elliptic curve, MME public key, the UE pair of keys, etc.) necessary to verify the MME signature and to generate the RES parameters.

In one embodiment, the BS 10—the UE signature aggregator—requires some ECC parameters to perform signature aggregation. These can be acquired, for instance, at time of setup of the BS 10. Then, for every new UE 14 with ECC capabilities attaching to the network, the MME 12 may provide the BS 10 with the UE group-ID during Initial Attach. In one embodiment, the BS 10 keeps group-ID to UE mapping until explicitly removed by the MME 12. This can be effectuated via a S1AP message such as the S1AP UE Cancel Context message proposed for RRC Connection Suspend/Resume procedure. The flow depicted in FIG. 10 summarizes the proposed changes during the Initial Attach.

Figure 10:
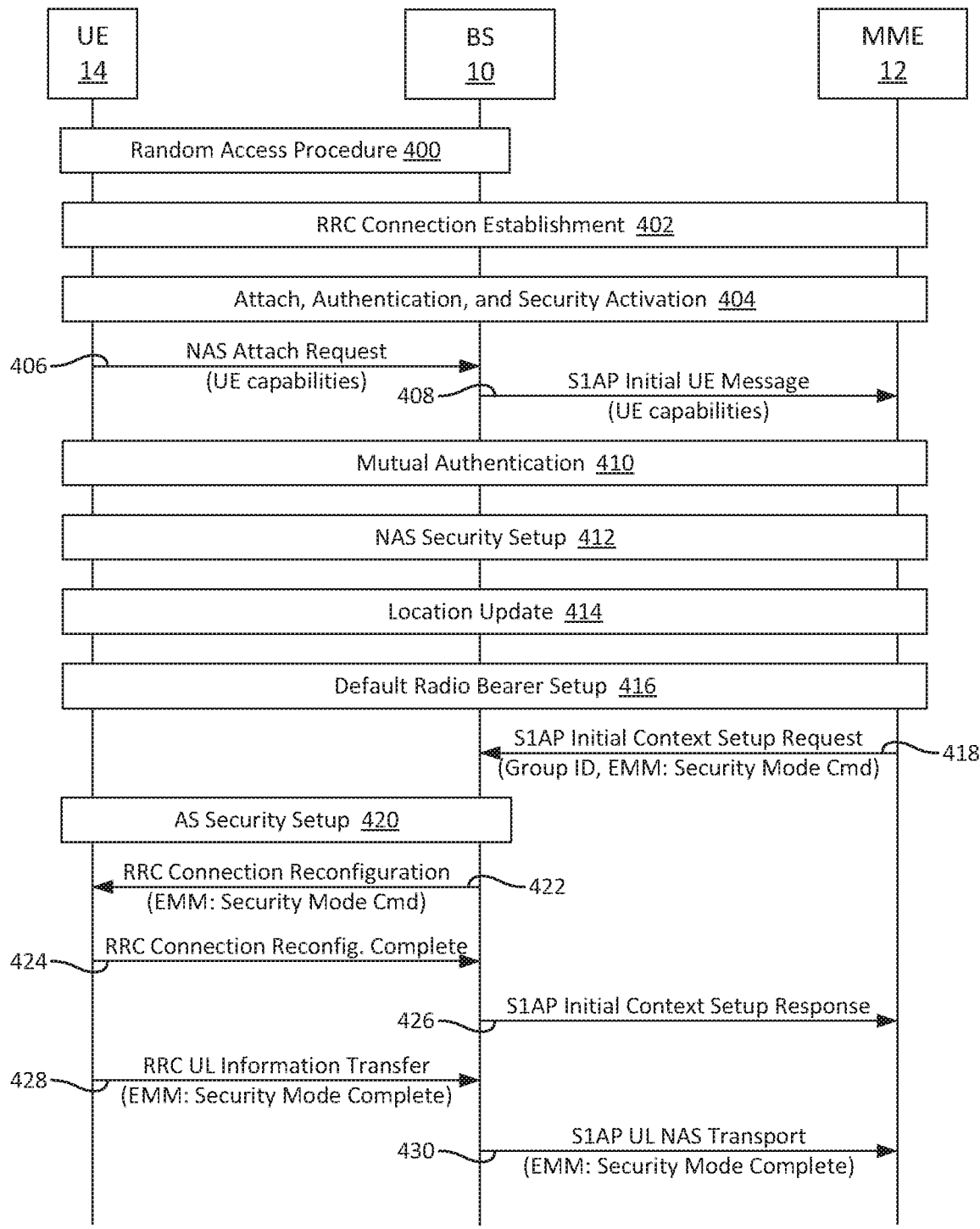
FIG. 10 illustrates an exemplary initial attach procedure according to an embodiment of the subject matter described herein.

FIG. 10 illustrates an exemplary initial attach procedure according to an embodiment of the subject matter described herein. The initial attach procedure, which involves messages exchanged between the UE 14, the BS 10, and the MME 12, is simplified for brevity in FIG. 10. In the embodiment illustrated in FIG. 10, the process starts with the Random Access Procedure 400, followed by RRC Connection Establishment 402, and Attach, Authentication, and Security Activation 404. When the UE 14 issues the NAS Attach Request (message 406), this message differs from the conventional NAS Attach Request message in that it contains a list of the network capabilities of one or more of the UEs. In one embodiment, message 406 contains the UE's network capabilities, including the list of supported encryption and integrity algorithms necessary to establish the NAS and AS secure channels. The current UE Network Capabilities IE, as defined in 3GPP TS 24.301 Sec. 9.9.3.34, has several spare bytes. The support for ECC authentication can be encoded as a single bit within octet 8 for instance. This information is passed to the MME 12 via the S1AP Initial UE Message (message 408).

The Mutual Authentication process 410, the NAS Security Setup process 412, the Location Update process 414, and the Default Radio Bearer Setup process 416 operate in the conventional manner, and correspond to the legacy UE-MME/HSS initial authentication.

In one embodiment, the S1AP Initial Context Setup Request (message 418) includes two elements not present in legacy signaling: a group ID for the group to which the UE 14 is being assigned by the MME 12, and an EMM Security Mode Command. In one embodiment, the EMM Security Mode Command contains the necessary ECC system parameters for the UE, together with the MME public key and a pair of keys that the MME generated for the current UE ($pub_k$, $priv_k$). This message is sent protected, since all the NAS UE—MME exchanges are encrypted and integrity protected following completion of the NAS Security Setup process 412. After completion of the AS Security Setup process 420, the BS 10 sends a RRC Connection Reconfiguration message 422 containing the EMM Security Mode Command to the UE 14, which responds with a RRC Connection Reconfiguration Complete message 424. The BS 10 then sends an S1AP Initial Context Setup Response message 426 to the MME 12.

The UE 14 then sends an RRC UL Information Transfer message 428 containing EMM Security Mode Complete to the BS 10. The BS 10 forwards this information as an S1AP UL NAS Transport message 430. Following reception of message 430 with Security Mode Complete, the default UE-MME/HSS authentication scheme will have been changed to the group authentication scheme as described herein. Whenever necessary, the UE can be commanded to change the authentication scheme via a new EMM Security Mode Command.

Thus, some methods and systems described herein can be used to modify the current 3GPP re-authentication. Table 3, below, summarizes the changes:

TABLE 3

Summary of changes

|  | Original 3GPP re-authentication (UE - MME/HSS) | New proposed re-authentication (UE - MME/HSS) |
| --- | --- | --- |
| MME Signal Load | One pair of Authentication Request/Authentication Response for every UE | One pair of Authentication Request/Authentication Response per group of UEs. |
| Mutual Authentication | Based on MAC with shared secret key. | Based on public key cryptography. |
| Kasme and key derivation | 3GPP | 3GPP |
| AUTN/RES (initial attach) | 3GPP | 3GPP |
| AUTN (re-authentication) | 3GPP: (SQN xor AK)\|\|RAND\|\| | (SQN xor AK)\|\|RAND\|\| MME_SIG |

TABLE 3-continued

Summary of changes

| | Original 3GPP re-authentication (UE - MME/HSS) | New proposed re-authentication (UE - MME/HSS) |
|---|---|---|
| RES (re-authentication) | MAC 3GPP | The UE_SIG signature. |

Among the three mechanisms described above, a challenging aspect is the second one involving signature aggregation. In one embodiment, ECC enhanced with a bilinear-map is utilized. This embodiment specifically requires that distinct signed messages have to be utilized for successful aggregated signature verification. To meet that requirement, in one embodiment, UE IDs (e.g., S-TMSI) are included in the UE signed messages. In addition, the BS 10, and the MME 12 (or an HSS) are supplied with some system parameters, such as the ECC curve parameters, the MME public key, and so on. In one embodiment, these parameters could be specific to one operator and the UE could receive the necessary parameters from the MME at Initial Attach via a secure NAS channel after a legacy 3GPP authentication. Theoretically, there is no limit on the N number of signatures to aggregate (i.e., the size of a UE group). In actual practice, the maximum number N may be limited based on, for instance, the MTU on the S1AP interface.

The following acronyms are used throughout this disclosure.

3GPP Third Generation Partnership Project
AMF Authentication and key Management Field
ASIC Application Specific Integrated Circuit
AUTN Authentication IE
BS Base Station
CK Confidential Key
CPU Central Processing Unit
DL Downlink
ECC Elliptic Curve Cryptography
EMM EPS Mobility Management
EPC Evolved Packet Core
EPS Evolved Packet System
FPGA Field Programmable Gate Array
IE Information Element
IK Integrity Key
IMEI International Mobile Equipment Identifier
IMSI International Mobile Subscriber Identifier
K secret Key
KSI Key Set Identifier
LTE Long Term Evolution
M-MTC Massive Machine Type Communication
MAC Message Authentication Code
MME Mobility Management Entity
NAS Non-Access Stratum
RAN Radio Access Network
RAND Random number IE
S-TMSI SAE Temporary Mobile Subscriber Identity
SAE System Architecture Evolution
SQN Sequence Number
UE User Equipment
UL Uplink
USIM Universal Subscriber Identity Module Those skilled in the art will recognize improvements and modifications to the embodiments of the present disclosure. All such improvements and modifications are considered within the scope of the concepts disclosed herein and the claims that follow.

What is claimed is:

1. A method of operation of a Base Station (BS) in a wireless telecommunications network, the method comprising:
receiving a group authentication request message, the group authentication request message comprising a group identifier;
identifying at least two User Equipments (UEs) as belonging to a group identified by the group identifier;
sending an individual authentication request message to each of the at least two UEs as belonging to the group identified by the group identifier;
receiving one authentication response, respectively, from each of the at least two UEs;
aggregating the authentication responses to create a group authentication response message, the group authentication response message being a single S1AP message that comprises one aggregated signature that corresponds to the at least two UEs where:
the aggregating step comprises performing aggregation for a specified duration of time; or
the aggregating step is performed until a specified number of authentication responses are received;
sending the group authentication response message; and
wherein the one aggregated signature has a same size as original signatures for the at least two UEs.

2. The method of claim 1 wherein the group authentication request message is received from a Mobility Management Entity (MME) or the group authentication response message is sent to the MME.

3. The method of claim 1 wherein identifying the at least two UEs as belonging to the group identified by the group identifier comprises using mapping information that maps the group identifiers to sets of UEs, each set containing at least one UE.

4. The method of claim 3 wherein the mapping information is received from a Mobility Management Entity (MME) and stored by the BS, or inferred by the BS from messages exchanged between the MME and the at least one UE.

5. The method of claim 1 wherein identifying the at least two UEs as belonging to a group comprises identifying the at least two UEs by at least one of:
an International Mobile Subscriber Identifier (IMSI);
an International Mobile Equipment Identifier (IMEI); and
a System Architecture Evolution (SAE) Temporary Mobile Subscriber Identity (S-TMSI).

6. The method of claim 1 wherein the aggregating step comprises an Elliptic Curve Cryptography (ECC) operation.

7. A Base Station (BS) in a wireless telecommunications network, the BS comprising:
a network interface for communicating with a telecommunications network;
one or more processors; and
memory storing instructions executable by the one or more processors, whereby the BS is operable to:
receive a group authentication request message, the group authentication request message comprising a group identifier;
identify at least two User Equipments (UEs) as belonging to a group identified by the group identifier;
send an individual authentication request message to each of the at least two UEs as belonging to the group by the group identifier;

receive an authentication response, respectively, from each of the at least two UEs;

aggregate the authentication responses to create a group authentication response message, the group authentication response message being a single S1AP message that comprises one aggregated signature that corresponds to the at least two UEs, where:

the aggregating step comprises performing aggregation for a specified duration of time; or the aggregating step is performed until a specified number of authentication responses are received; and send the group authentication response message, wherein the one aggregated signature has a same size as original signatures for the at least two UEs.

8. A method of operation of a Mobility Management Entity (MME) in a wireless telecommunications network, the method comprising:

sending, to a Base Station (BS) a group authentication request message, the group authentication request message comprising a group identifier;

receiving from the BS, a group authentication response message, the group authentication response message being a single S1AP message that comprises one aggregated signature that corresponds to the at least two UEs and identifying the set of at least two User Equipments (UEs) and including an aggregated response comprising an aggregate of the responses received from the set of at least two UEs;

verifying the aggregated response; and wherein the one aggregated signature has a same size as original signatures for the at least two UEs.

9. The method of claim 8 wherein verifying the aggregated response comprises:

determining whether the aggregated response is valid;

upon the determination that the aggregated response is valid, identifying the identified set of at least two UEs as being authenticated; and upon a determination that the aggregated response is invalid, performing authentication of each UE in the identified set of at least two UEs individually.

10. The method of claim 8 further comprising, prior to sending the group authentication request message:

identifying the set of at least two UEs as belonging to a group having the group identifier; and sending, to the BS, at least one of:

information that maps the group identifier to the set of at least two UEs; or information that is used by the BS to infer mapping from messages exchanged between the MME and the set of at least two UEs.

11. The method of claim 10 wherein each UE in the set of at least two UEs is identified using at least one of:

an International Mobile Subscriber Identifier (IMSI);

an International Mobile Equipment Identifier (IMEI); and a System Architecture Evolution (SAE) Temporary Mobile Subscriber Identity (S-TMSI).

12. The method of claim 8 wherein the set of at least two UEs is chosen based on at least one of: UE profiles, UE location, UE type, and UE capabilities.

13. The method of claim 8 wherein the verifying step comprises an Elliptic Curve Cryptography (ECC) operation.

14. A Mobility Management Entity (MME) in a wireless telecommunications network, the MME comprising:

a network interface for communicating with a telecommunications network;

one or more processors; and memory storing instructions executable by the one or more processors, whereby the MME is operable to:

send, to a Base Station (BS), a group authentication request message, the group authentication request message comprising a group identifier;

receive from the BS, a group authentication response message, the group authentication response message being a single S1AP message that comprises one aggregated signature that corresponds to the at least two UEs and identifying a set of at least two User Equipment (UEs) and including an aggregated response comprising an aggregate of the responses received from the identified set of at least two UEs; and verify the aggregated response, wherein the one aggregated signature has a same size as original signatures for the at least two UEs.

* * * * *